Jan. 20, 1925. 1,523,911

A. STAEHELI

DISPENSING DEVICE FOR SEALED CONTAINERS

Filed Sept. 17, 1924

WITNESSES
Edw. Thorpe
Hugh H. Ett

INVENTOR
Alphonse Staeheli
BY
ATTORNEYS

Patented Jan. 20, 1925.

1,523,911

UNITED STATES PATENT OFFICE.

ALPHONSE STAEHELI, OF NEW YORK, N. Y.

DISPENSING DEVICE FOR SEALED CONTAINERS.

Application filed September 17, 1924. Serial No. 738,233.

*To all whom it may concern:*

Be it known that I, ALPHONSE STAEHELI, a citizen of the United States of America, and a resident of the city of New York, borough of Manhattan, in the county of New York and State of New York, have invented a new and Improved Dispensing Device for Sealed Containers, of which the following is a full, clear, and exact description.

This invention relates to dispensing devices and refers particularly to a device for dispensing the contents of sealed containers such as evaporated or condensed milk cans, syrup and cans and the like.

Among the principal disadvantages apparent in devices of this character which have been heretofore devised, is the failure to provide an insertable pouring spout which is so positioned and maintained with respect to the container as to facilitate the draining of the entire contents.

It is therefore an object of the invention to provide a dispensing device of this character comprising a pouring spout which is insertable within one of the ends of the container adjacent its periphery, so that the inlet end of the spout is disposed parallel and in close contact with the inner surface of the side wall of the container and in which means is provided on the spout for engagement with the outer surface of the side wall whereby to maintain the spout in contact with said inner surface of the side wall.

As a further object the invention comprehends a dispensing device of the character described, which includes in combination with the pouring spout, a puncturing implement for forming the opening which receives the spout and which also serves to provide a vent opening for the cover in addition to constituting an anchoring element for a spout cover guard.

The invention furthermore contemplates a device of the character set forth which is comparatively simple in its construction and mode of attachment, which is inexpensive to manufacture and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general means of the terms in which the claims are expressed.

In the drawings—

Figure 1:
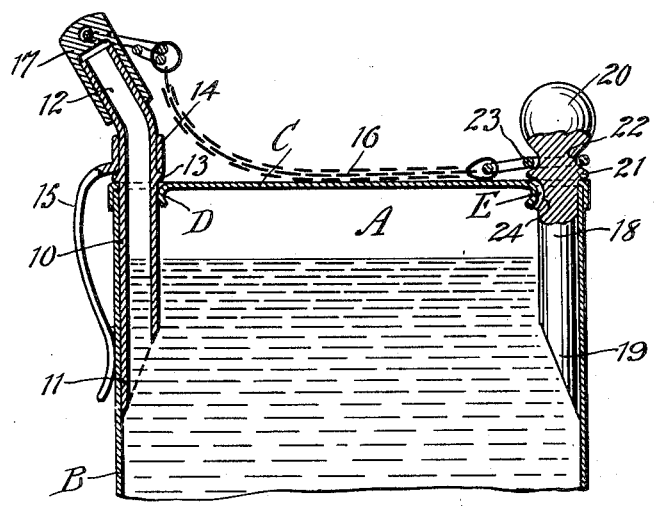
Figure 1 is a vertical sectional view illustrating the device in applied position to the container and with the pouring spout closed.
Figure 2:
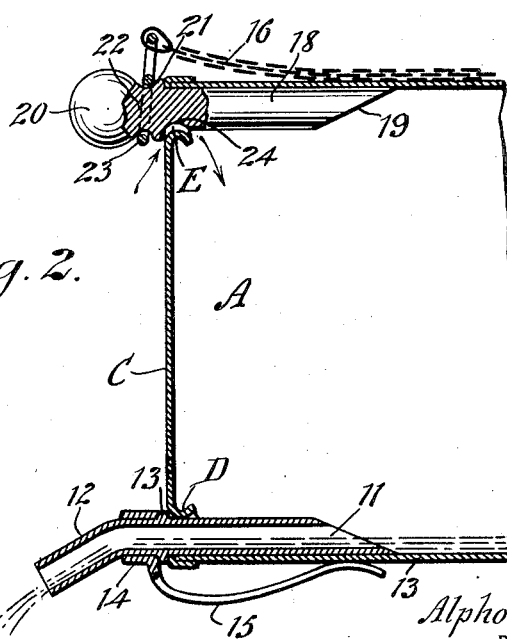
Fig. 2 is a similar view with the container tilted for discharging its contents through the pouring spout.

Referring to the drawings by characters of reference A designates a container having a side wall B and a closed end C. The pouring device constituting an attachment for the container consists of a substantially tubular pouring spout 10 having an inlet end 11 cut off at an angle or beveled for a purpose to be hereafter set forth and further provided with an angularly disposed discharge end 12. Intermediate its ends, the spout is provided with an external annular bead 13 immediately above which the sleeve 14 of a spring arm or clip 15 is arranged and secured. In practice a puncture D of an appropriate size to snugly receive the pouring spout 10 is provided in the end or head C of the container A adjacent its periphery so that the punctured periphery alines with the inner surface of the side wall B. The pouring spout inlet end 11 is inserted through the puncture D until the bead 13 contacts with the head or end C and with the clip 15 engaging the outer surface of the side wall B to clamp and maintain the interior portion of the spout parallel to and in engagement with the inner surface of the side wall B. The inclination of the cutaway inlet end 11 is such that the projecting terminal is disposed against the side wall.

In order to provide means for venting the interior of the container A to the atmosphere during the pouring operation, to provide means for forming the puncture D for receiving the pouring spout and to provide an anchoring device for the guard element 16 of the pouring spout closure cap 17 a member 18 is provided which consists of a hardended shank of a diameter approximately the same as the diameter of the pouring spout and provided with a pointed or sharpened terminal 19 at one end and a spherical head 20 at its opposite end. At the juncture of the spherical head 20 with the shank 18 an annular enlarged shoulder 21 is provided which forms a reduced neck 22 between the shoulder and head. Arranged around the neck 22 between the shoulder and head is an attaching ring 23 to which the free end of the guard element is secured.

After the puncture D is formed and the pouring spout is inserted, a vent opening or puncture E is formed preferably at a diametrically opposite point in the head C and within which the member 18 remains. At the juncture of the shank 18 with the shoulder 21 a recess or depression 24 is provided to allow further venting of the interior of the container while the shoulder 21 serves to substantially cover the vent opening E to exclude the entrance of dust, dirt or other foreign matter.

From the foregoing it will thus be seen that a dispensing attachment for sealed containers has been provided in which the pouring spout is so positioned and maintained with respect to the container as to afford means for draining the entire contents.

I claim:

1. A dispensing device for sealed containers comprising a tubular pouring spout one end of which is insertable through an end of the container adjacent its marginal edge and means carried by the spout and engageable with the outer surface of the side wall of the container for clamping and maintaining the inlet end of the spout against the inner surface of said side wall, a closure cap for the outlet end of the spout, a flexible guard for said cap and an anchoring means at the free end of the closure cap guard including a shank having a sharpened end and an enlarged headed end.

2. A dispensing device for sealed containers comprising a tubular pouring spout one end of which is insertable through an end of the container adjacent its marginal edge and means carried by the spout and engageable with the outer surface of the side wall of the container for clamping and maintaining the inlet end of the spout against the inner surface of said side wall, a closure cap for the outlet end of the spout, a flexible guard for said cap and an anchoring means at the free end of the closure cap guard including a shank having a sharpened end and an enlarged headed end.

3. A dispensing device for sealed containers comprising a tubular pouring spout one end of which is insertable through an end of the container adjacent its marginal edge and means carried by the spout and engageable with the outer surface of the side wall of the container for clamping and maintaining the inlet end of the spout against the inner surface of said side wall, a closure cap for the outlet end of the spout, a flexible guard for said cap and an anchoring means at the free end of the closure cap guard including a shank having a sharpened end and an enlarged headed end, said cap being further provided with a shoulder at the juncture of the head with the shank constituting a dust shield for covering the vent opening, the said shank having a depression at its juncture with the shoulder cooperating with the opening to afford an air passage.

ALPHONSE STAEHELI.